United States Patent [19]

Carter, Sr.

[11] Patent Number: 4,537,426
[45] Date of Patent: Aug. 27, 1985

[54] COUPLINGS FOR NON-FERROUS PIPE

[75] Inventor: J. Warne Carter, Sr., Wichita Falls, Tex.

[73] Assignee: Ameron Inc., Monterey Park, Calif.

[21] Appl. No.: 391,826

[22] Filed: Jun. 24, 1982

[51] Int. Cl.³ .......................................... A16L 17/02
[52] U.S. Cl. ................................... 285/110; 285/353; 285/369; 285/423; 285/DIG. 16; 285/156; 285/179
[58] Field of Search ................. 285/110, 112, 353, 55, 285/DIG. 16, 423, 369, 355, 175, 156, 179

[56] References Cited

U.S. PATENT DOCUMENTS

| | | | |
|---|---|---|---|
| 1,590,357 | 6/1926 | Feisthamel . | |
| 1,997,731 | 4/1935 | Humason | 166/14 |
| 2,066,008 | 12/1936 | Knoerzer | 285/175 |
| 2,442,034 | 5/1948 | Busch | 285/163 |
| 2,452,057 | 10/1948 | Kehoe | 285/90 |
| 2,463,235 | 3/1949 | Andrews | 285/194 |
| 2,498,831 | 2/1950 | Veitch | 285/161 |
| 2,509,363 | 5/1950 | Page | 285/157 |
| 2,546,096 | 3/1951 | Hauf | 285/196 |
| 2,871,031 | 1/1959 | Altemus et al. | 285/18 |
| 2,876,154 | 3/1959 | Usab | 154/83 |
| 2,899,217 | 8/1959 | Ashbrook et al. | 285/105 |
| 2,933,428 | 4/1960 | Mueller | 154/116 |
| 2,962,314 | 11/1960 | Rickard | 288/5 |
| 2,975,799 | 3/1961 | Stilwell | 137/521 |
| 3,179,446 | 4/1965 | Paterson | 285/110 |
| 3,183,021 | 5/1965 | Rickard | 285/5 |
| 3,191,973 | 6/1965 | Guarnaschelli | 285/110 |
| 3,245,699 | 4/1966 | Peterman | 285/110 |
| 3,245,701 | 4/1966 | Leopold, Jr. et al. | 285/174 |
| 3,264,013 | 8/1966 | Richardson et al. | 285/22 |
| 3,266,821 | 8/1966 | Safford | 285/40 |
| 3,307,860 | 3/1967 | Blount et al. | 285/55 |
| 3,315,971 | 4/1967 | Sakurada | 277/207 |
| 3,463,518 | 8/1969 | Broussard et al. | 285/340 |
| 3,508,771 | 4/1970 | Duret | 285/334 |
| 3,540,757 | 11/1970 | Neher | 285/21 |
| 3,667,784 | 6/1972 | Hokanson et al. | 285/173 |
| 3,730,562 | 5/1973 | Viazzi | 285/110 |
| 3,784,239 | 1/1974 | Carter et al. | 285/293 |
| 3,877,733 | 4/1975 | Straub | 285/112 X |
| 4,014,568 | 3/1977 | Carta et al. | 285/423 X |
| 4,047,739 | 9/1977 | Aitken | 285/21 |
| 4,077,656 | 3/1978 | Swindler | 285/110 |
| 4,109,941 | 8/1978 | Wood et al. | 285/111 |
| 4,174,859 | 11/1979 | Houghton | 285/111 |

FOREIGN PATENT DOCUMENTS

| | | | |
|---|---|---|---|
| 522321 | 10/1955 | Belgium | 285/112 |
| 39820 | 3/1977 | Japan | 285/112 |
| 777697 | 6/1957 | United Kingdom . | |
| 1439370 | 6/1976 | United Kingdom | 285/423 |

Primary Examiner—Dave W. Arola
Attorney, Agent, or Firm—Shapiro and Shapiro

[57] ABSTRACT

A non-ferrous pipe coupling comprises tubular threaded male and female coupling elements attached to ends of respective pipe sections. The male element terminates in a cylindrical non-threaded, non-tapering sealing surface adjacent its threads and the female coupling element, which may be filament-wound, includes an internal sealing sleeve or liner with a web that provides a lip seal around the cylindrical sealing surface of the male element. The web is urged into sealing engagement with the cylindrical surface by fluid pressure within the coupling. The liner precludes egress of fluid from within the coupling through the female coupling element.

7 Claims, 6 Drawing Figures

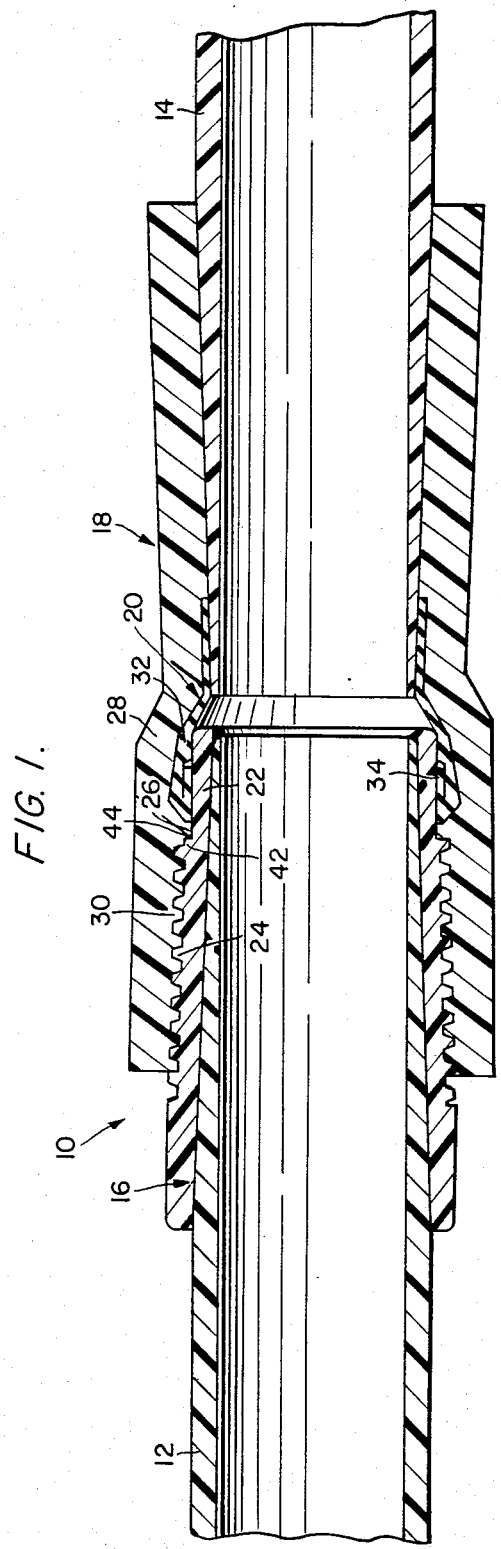
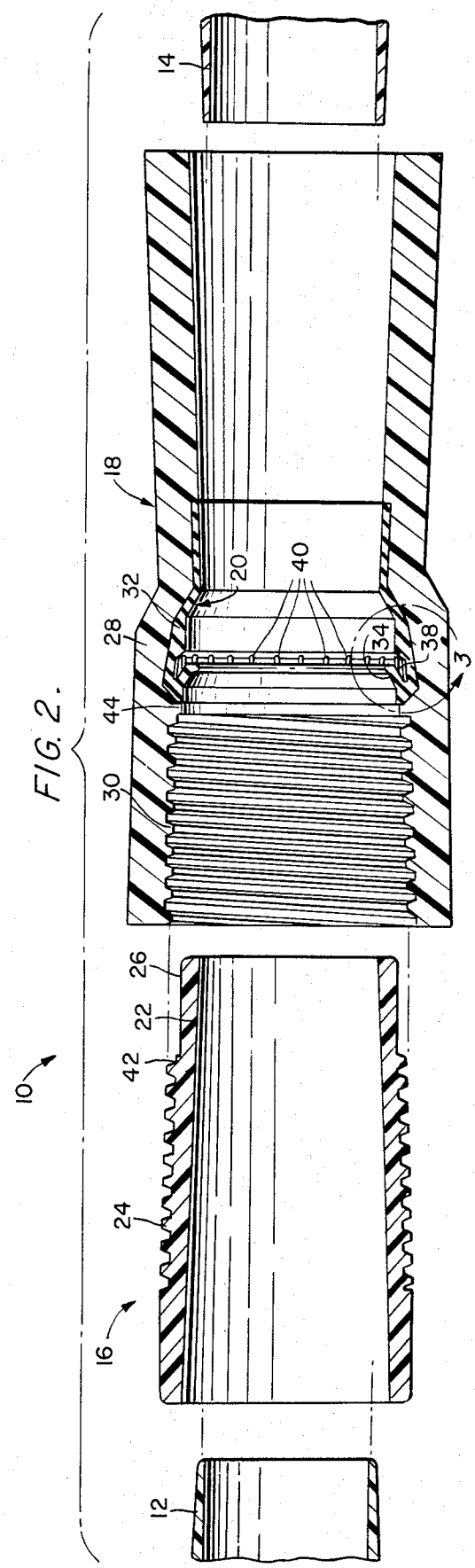

COUPLINGS FOR NON-FERROUS PIPE

BACKGROUND OF THE INVENTION

The invention relates to couplings for non-ferrous pipe (or tubing) of plastic or fiberglass, for example.

As referred to in prior U.S. Pat. No. 3,784,239, the use of non-ferrous pipe has been hindered by problems in effectively joining one pipe section to another. One form of coupling suitable for this purpose is described in the patent and comprises complementary threaded male and female coupling elements bonded to respective pipe ends of a pair of pipe sections so that the coupling elements may be threadably engaged and disengaged to couple and uncouple the sections. The male coupling element (sleeve) has a tapered threaded terminal portion adapted to be received in a corresponding tapered portion of the female coupling element, and the female element, which may be in the form of a filament-wound collar, carries an O-ring seal which engages around the tapered terminal portion of the male element. The patent also describes a method of making the female elements (collars) by a filament winding technique.

Couplings as described in the patent are generally suitable for use in diverse applications. However, sealing between the pipe sections is dependent on the coupling elements being threaded together sufficiently tightly so that the respective tapered portions suitably compress the O-ring therebetween. Thus, the degree of tightening is critical, and undertightening may lead to leakage while overtightening may make separation of the coupling difficult. It has also been found that in couplings using filament-wound female coupling elements, high working pressures within the coupling may produce fine cracking or crazing on the interior surface of the female element resulting in leakage of fluid therethrough.

The present invention provides a coupling in which sealing is substantially independent of the degree of tightening between the respective coupling elements, and which is not subject to leakage of fluid through the female coupling element as in the prior couplings.

SUMMARY OF THE INVENTION

Broadly stated, the present invention provides, at least in one aspect, a coupling for non-ferrous pipe which comprises threaded tubular male and female coupling elements for attachment to respective pipe sections, so that the coupling elements may be threaded into and out of engagement to couple and uncouple the pipe sections. The female coupling element may be a filament-wound collar, and to prevent egress of fluid therethrough from within the coupling, it may be provided with a tubular substantially fluid-impervious resilient liner or sleeve of rubber or the like positioned to extend between the ends of the respective pipe sections with means forming a seal being provided between the liner and each of the pipe sections.

The means forming a seal between the liner and one pipe section may, in accordance with another independent aspect of the invention, comprise an internal circumferential web on the liner, which in use forms a lip seal around a non-threaded, non-tapering sealing surface on a terminal portion of the male coupling element adjacent its threads. The design of the lip seal may be such that fluid pressure in the coupling urges the seal into engagement with the sealing surface, whereby the sealing effect is enhanced with increases in such fluid pressure.

The liner may have a main body portion bonded to the interior of the female coupling element and the means forming a seal between the liner and the other pipe section may comprise an end of the main body portion which is trapped between the interior of the female element and the exterior of the pipe section and bonded to each. Alternatively, the female element may be formed with plural threads to receive plural male coupling elements, such as in the elbow or "T" fitting, each male element being attached to a respective pipe section. The liner may, in this case, have plural webs each forming a lip seal around a non-threaded terminal portion of a respective male coupling element. Additional features of the invention will be apparent from the following description and claims read in conjunction with the attached drawings.

BRIEF DESCRIPTION OF DRAWINGS

FIG. 1 is a longitudinal sectional view through a pipe coupling in accordance with the invention.

FIG. 2 is an exploded view of the pipe coupling components shown in FIG. 1.

DESCRIPTION OF PREFERRED EMBODIMENTS

Figure 3:
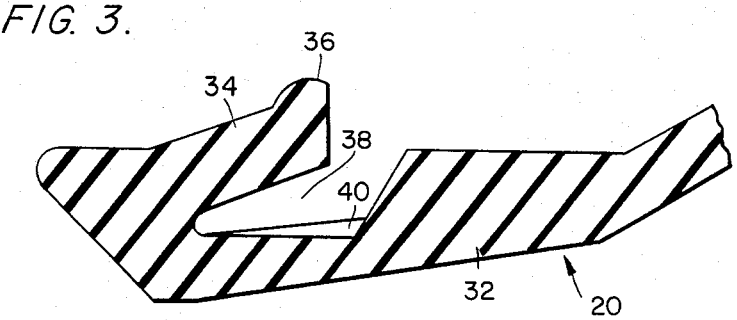
FIG. 3 is an enlarged view of part of a sealing sleeve, or liner, shown circled in FIG. 2.

Pipe coupling 10 shown in FIGS. 1 and 2 for connecting the ends of a pair of non-ferrous (e.g. fiberglass or plastics) pipe sections 12 and 14, is of the general type described in U.S. Pat. No. 3,784,239, the disclosure of which is incorporated herein by reference. The pipe sections have tapered ends as shown, and correspondingly tapered threaded male and female coupling elements 16 and 18 are chemically bonded to the ends of the respective pipe sections. Thus in the illustrated embodiment, as shown in FIG. 1, male coupling element (or sleeve) 16 is chemically bonded to the end of pipe section 12, and female coupling element (collar) 18 is chemically bonded to the end of pipe section 14. FIG. 2 shows the components before bonding of the pipe sections to the coupling elements. A tubular sealing sleeve, or liner 20 is provided within the female coupling element as will be described, to preclude leakage of fluid from the joint between the pipe sections through the female element.

Female coupling element 18 may be filament-wound by a process as described in the aforementioned patent, and male coupling element 16 may be centrifugally molded by a conventional fiberglass molding method, with its internal taper being suitably machined after molding. It will be understood that the pipe sections may be coupled and uncoupled by threadably engaging and disengaging the male and female coupling elements.

Male coupling element 16 terminates in a non-threaded portion 22 adjacent threads 24 and which has a axially extending, non-tapered cylindrical outer sealing surface 26. Portion 22 of the male coupling element is received in a radially enlarged portion 28 of female coupling element 18 adjacent the female threads 30. Liner 20, which may be molded in rubber, such as BUNA-N of about 70–75 durometer, has a main body portion 32 chemically bonded to the interior of female element 18, with one end trapped between the element 18 and pipe section 14 to form a seal between the liner and the pipe section. (Bonding of element 18 to pipe section 14 may also serve to bond the end of liner 20 to the exterior of the pipe section.) Adjacent its opposite end, liner 20 is formed with an internal circumferential web 34 (see FIGS. 2 and 3) which forms a lip seal around sealing surface 26 of the male coupling element. Web 34 may terminate in a sealing bead 36 (FIG. 3)

In the normal uncompressed state of web 34 (see FIGS. 2 and 3), a space 38 is formed between the web and the main body portion of the liner, and circumferentially spaced tapered ribs 40 are formed on the inner surface of the main body portion adjacent the web. Thus, when the web is compressed in use, against surface 26, the ribs insure that a space will remain between the web and the body portion of the liner for access of fluid from within the coupling. The pressure of such fluid tends to press the web into sealing engagement with surface 26, and the sealing effect is enhanced with increases in fluid pressure.

It will be noted from FIGS. 1 and 2 that web 34 may provide an equally effective seal around surface 26 irrespective of the precise axial positioning of the web along the surface. Thus, the degree of threaded engagement between the male and female coupling elements is no critical in obtaining an adequate seal, provided web 34 properly engages surface 26. To promote proper engagement a positive thread stop such as positive thread ends 42, 44 may be provided on the respective threads.

The sealing effect of web 34 and surface 26 is independent of the thread engagement, and somewhat loose, non-sealing threads may therefore be used. The coupling is suitable for high pressure applications, e.g., of the order of 2,000 PSI pipe pressure, with liner 20 effectively forming a barrier inhibiting egress of fluid from within the coupling through element 18. For high pressure applications a pitch of about four threads per inch has been found to be suitable for threads 24 and 30.

Figure 4:
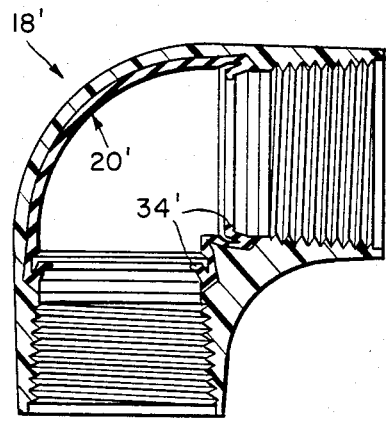
FIGS. 4 to 6 are longitudinal sectional views through alternative pipe coupling elements in accordance with the invention.
Figure 5:
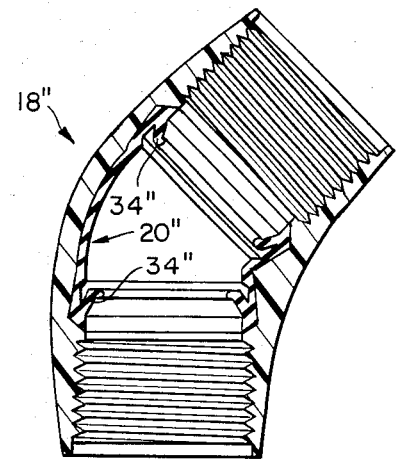
Figure 6:
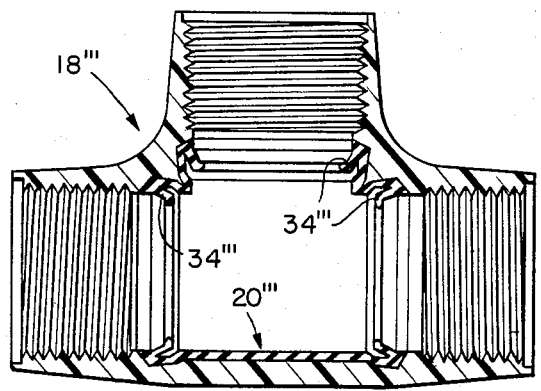

FIGS. 4 to 6 show alternative female pipe coupling elements 18′, 18″, 18‴, formed with plural threaded sections, each adapted to receive a male coupling element bonded to an end of a pipe section as previously described. Thus, FIG. 4 shows an elbow fitting 18′ wherein the threaded sections are angled at 90°, FIG. 5 shows an elbow fitting wherein the threaded sections are angled at 45°, and FIG. 6 shows a T-fitting. In each case the female coupling element includes an internal sealing sleeve or liner 20′, 20″, or 20‴ bonded thereto and having plural webs 34′, 34″, or 34‴ for forming lip seals around non-threaded cylindrical terminal portions of respective male coupling elements threaded into the female element. The male elements (not shown) may, in each case, be identical to that shown in FIGS. 1 and 2. The webs 34′, 34″, and 34‴ provide lip seals in like manner to web 34 in FIG. 1, and, in each case, the liners may include ribs corresponding to ribs 40 shown in FIG. 3. Positive thread stops may also be provided in like manner to the FIG. 1 arrangement. The couplings all operate in like manner to provide a seal around the terminal portions of the respective male coupling elements which is enhanced as the internal pipe pressure increases, and with the liner, in each case, precluding leakage of fluid through the female coupling element.

It will be seen from the foregoing that the invention provides pipe couplings for non-ferrous pipe in which the respective components may be readily threaded and unthreaded to couple and uncouple respective pipe sections, and wherein the seal between the components is effectively independent of the degree of tightening of the threads, the seal moreover being enhanced as fluid pressure within the coupled pipe sections is increased and the coupling having resistance against fluid leakage even at high working pressures. Couplings in accordance with the invention combine the advantages of a threaded connection, which facilitates coupling and uncoupling of pipe sections and provides a secure joint, with an efficient seal that is substantially independent of the degree of tightness of the threads, thereby effectively avoiding problems of over or under tightening of the joint.

While only preferred embodiments of the invention are described herein in detail, the invention is not limited thereby, and modifications may be made within the scope of the attached claims.

What is claimed is:

1. A coupling for joining two sections of non-ferrous pipe, at least one of said sections having an end portion which is tapered inwardly toward its extremity, said coupling comprising a female coupling element having a first end with a tapered inner wall portion complementary to said tapered end portion of said one pipe section for receiving the same and a second end with a threaded inner wall portion, a male coupling element adapted to be secured about an end of the remaining pipe section, said male coupling element having an externally threaded portion for threadably engaging said threaded inner wall portion of said female coupling element and having a terminal portion with a cylindrical, non-tapered outer surface receivable within said female coupling element in advance of said externally threaded portion, and a tubular liner for effecting a fluid seal between said pipe sections when said coupling elements are threadably engaged, said liner having an internal circumferential web adjacent one end thereof for forming a lip seal against said outer surface of said male coupling element, said liner further having a tapered sleeve portion at an opposite end thereof for sealingly engaging, along its outer surface, said tapered inner wall portion of said female coupling element and for sealingly engaging, along its inner surface, said tapered end portion of said one pipe section.

2. A coupling as defined in claim 1 including a space defined between the web and a main body portion of said liner, and means within said space providing access thereto for fluid in the coupling effective to urge the web into contact with said outer surface of said terminal portion of the male coupling element. pg,11

3. A coupling as defined in claim 2 wherein the means within said space comprises circumferentially spaced ribs formed on one of the web and the main body portion of said liner.

4. A coupling as defined in claim 1 including means defining a positive stop for limiting threaded engagement of the respective coupling elements.

5. A coupling as defined in claim 1 wherein the female coupling element is a filament-wound collar, the male coupling element is a fiberglass molding and the sealing sleeve is a rubber molding.

6. A coupling as defined in claim 1, wherein the male coupling element is bonded to said end of said remaining pipe section and wherein said tapered inner wall portion of said female coupling element is bonded to said tapered end portion of said one pipe section.

7. A coupling as defined in claim 1, wherein said tapered sleeve portion of said liner is bonded to one of said tapered inner wall portion of said female coupling element and said tapered end portion of said one pipe section.

* * * * *